United States Patent
Frome

(10) Patent No.: US 8,655,831 B1
(45) Date of Patent: Feb. 18, 2014

(54) SMART PARSING OF DATA

(75) Inventor: Eric Allan Frome, Farmington, MN (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/562,783

(22) Filed: Jul. 31, 2012

(51) Int. Cl.
*G06F 17/30* (2006.01)

(52) U.S. Cl.
USPC .......................................................... 707/602

(58) Field of Classification Search
USPC .......................................................... 707/602
See application file for complete search history.

(56) References Cited

U.S. PATENT DOCUMENTS

| | | | |
|---|---|---|---|
| 2004/0044674 A1* | 3/2004 | Mohammadioun et al. | 707/100 |
| 2010/0104188 A1* | 4/2010 | Vetere | 382/177 |
| 2012/0005184 A1* | 1/2012 | Thilagar et al. | 707/706 |
| 2012/0197914 A1* | 8/2012 | Harnett et al. | 707/755 |

* cited by examiner

*Primary Examiner* — Khanh Pham
(74) *Attorney, Agent, or Firm* — Fish & Richardson P.C.

(57) ABSTRACT

Methods, systems, and apparatus, including computer programs encoded on a computer storage medium, for automatically parsing data from disparate data sources. In some implementations, actions include receiving first data from a first data source, identifying a first regular expression that corresponds to a data format of the first data, selecting a first set of parsing rules from a plurality of parsing rules based on the first regular expression, parsing the first data based on the first set of parsing rules to provide a first set of sub-data, populating data fields of a first data object with respective sub-data from the first set of sub-data, and transmitting the first data object to a computing device.

20 Claims, 4 Drawing Sheets

SMART PARSING OF DATA

BACKGROUND

Industries can receive data from various, disparate sources. For example, data can be received as a sequence of information that can be provided in disparate formats depending on the data source. To enable processing of the data, the data is parsed. Costly and time-consuming system customization may be required to enable parsing of data received from each of the disparate data sources. Further, when a new data source is added, additional system customization may be required to successfully parse data from the new data source.

SUMMARY

Implementations of the present disclosure include computer-implemented methods for automatically parsing data from disparate data sources. In some implementations, actions include receiving first data from a first data source, identifying a first regular expression that corresponds to a data format of the first data, selecting a first set of parsing rules from a plurality of parsing rules based on the first regular expression, parsing the first data based on the first set of parsing rules to provide a first set of sub-data, populating data fields of a first data object with respective sub-data from the first set of sub-data, and transmitting the first data object to a computing device.

In some implementations, actions further include generating the first data object based on the first set of parsing rules, the first set of parsing rules defining a type of the first data object.

In some implementations, identifying the first regular expression includes comparing the first data to each of a plurality of regular expressions, the first regular expression being provided in the plurality of regular expressions.

In some implementations, selecting a first set of parsing rules based on the first regular expression is based on a mapping between a plurality of regular expressions and sets of parsing rules.

In some implementations, an identifier associated with the first regular expression is used to identify the first set of parsing rules from the mapping.

In some implementations, populating data fields of the first data object with respective sub-data from the first set of sub-data is based on the first set of parsing rules.

In some implementations, one or more parsing rules in the first set of parsing rules maps sub-data to data fields.

In some implementations, the first data source includes an artifact associated with a person.

In some implementations, the artifact includes one of a customer card, a driving license, a credit card and a passport.

In some implementations, the first data includes an entirety of data stored on the first data source.

In some implementations, the first data is one of electronically stored on the first data source, magnetically stored on the first data source and graphically stored on the first data source.

In some implementations, the first data is received from the computing device.

In some implementations, the computing device includes one of an agent terminal and a kiosk.

In some implementations, actions further include storing the first data object in computer-readable memory.

In some implementations, the first data includes free-form text that is input by a user of the computing device.

In some implementations, the first data object includes one or more search queries that can be processed to provide search results responsive to the first data.

In some implementations, actions further include storing a second regular expression in a regular expression database, and storing a second set of parsing rules in a parsing rule database, the second set of parsing rules corresponding to the second regular expression and being executable to populate one or more data objects based on data provided from one or more data sources.

In some implementations, actions further include receiving second data from a second data source, identifying a second regular expression that corresponds to a data format of the second data, selecting a second set of parsing rules from a plurality of parsing rules based on the second regular expression, parsing the second data based on the second set of parsing rules to provide a second set of sub-data, populating data fields of a second data object with respective sub-data from the second set of sub-data, and transmitting the second data object to the computing device.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to automatically parsing data to populate a data object. More particularly, implementations of the present disclosure are directed to parsing out sub-data from the data and populating data fields of the data object with the sub-data. In some implementations, the data is compared to a plurality of regular expressions to identify a particular regular expression that corresponds to the data. In some implementations, one or more parsing rules are identified from a plurality of parsing rules based on the particular regular expression. The data is parsed based on the parsing rules to identify a plurality of sub-data from the data. One or more object fields of a data object are populated with the sub-data based on the parsing rules. In some examples, a type of the data object is determined based on the parsing rules and the data object is generated. In some implementations, additional data can be accounted for. In some examples, a configuration can be expanded to include a regular expression in the plurality of regular expressions, to include a parsing rule in the plurality of parsing rules and to include a data object type.

In some implementations, the data is received at a front-end service and is provided to a back-end service. In some examples, the back-end service processes the data, parses the data and populates a data object based on the data. In some examples, the back-end service provides the data object (populated) to the front-end service. In some examples, the front-end service executes further functionality based on the data object.

Implementations of the present disclosure are discussed in detail herein with reference to an example context. The example context includes a transportation service provider that provides accommodations on one or more travel conveyances. An example travel service provider can include an airline, an example accommodation can include a seat and an example travel conveyance can include an aircraft. It is appreciated, however, that the example context is provided for purposes of illustration and that implementations of the present disclosure are equally applicable in other contexts.

Figure 1:
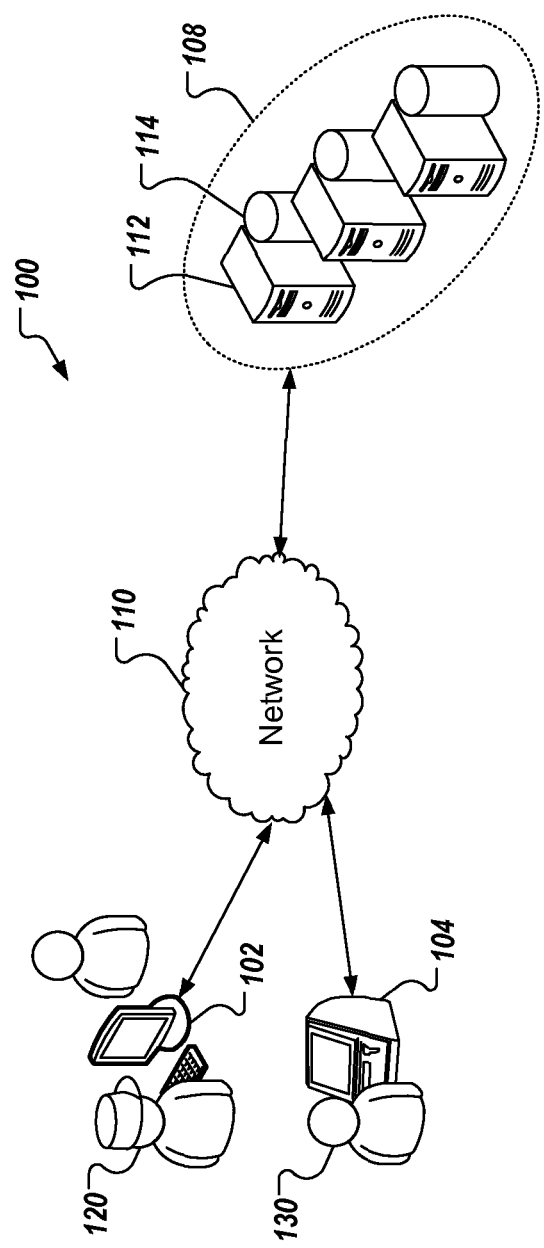
FIG. 1 depicts an example system that can execute implementations of the present disclosure.

FIG. 1 depicts an example system 100 that can execute implementations of the present disclosure. In the depicted example, the system 100 includes computing devices 102, 104 that communicate with a server system 108 over a network 110. In some examples, the computing devices 102, 104 can represent various forms of processing devices including, but not limited to, a desktop computer, a laptop computer, a tablet computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. As discussed in further detail herein, the computing devices 102, 104 can interact with application software provided in the server system 108.

In some implementations, the server system 108 can include one or more 112 servers and databases 114. In some examples, the servers 112 can represent various forms of servers including, but not limited to a web server, an application server, a proxy server, a network server, or a server farm. For example, the servers 112 can be application servers that execute software accessed by computing devices 102, 104. In operation, multiple computing devices 102, 104 (e.g., as clients) can communicate with the servers 112 by way of the network 110. In some implementations, a user can invoke applications available on the servers 112 in a user-interface application (e.g., a web browser) running on the computing device 102, 104. Each application can individually access data from one or more repository resources (e.g., databases 114).

In some implementations, the system 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., computing devices 102, 104) can communicate with the servers 112 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

In some implementations, the computing devices 102, 104 can each establish its own session with the servers 112. Each session can involve two-way information exchange between the computing devices 102, 104 and the servers 112. For example, a Hypertext Transfer Protocol (HTTP) session can allow the association of information with individual computing devices 102, 104. In some examples, a session can be stateful session, in which at least one of the communicating parts (e.g., the servers 112 or the computing device 102, 104 stores information about the session history in order to be able to communicate. In some examples, stateless communication during a stateless session includes independent requests with associated responses.

As noted above, implementations of the present disclosure are discussed in the non-limiting, example context of the travel industry. An example within the example context can include passenger check-in for travel on a travel conveyance. In this example context, the computing devices 102, 104 can be devices used for passenger check-in and/or boarding to a travel conveyance (e.g., an aircraft).

In some examples, the computing device 102 can be operated by an agent 120 that checks in passengers and/or boards passengers to a travel conveyance. To that end, the computing device 102 can communicate with one or more other devices that are directly connected to the computing device 102. Example devices can include a scanner (e.g., a barcode scanner, a QR code scanner), a scale (e.g., to weigh luggage), a printer (e.g., to print boarding passes and/or receipts) and a reader (e.g., a loyalty card, a credit card, driver license and/or passport reader).

In some examples, the computing device 104 can include a passenger check-in kiosk and can be operated by an agent (e.g., the agent 120) and/or by a passenger 130. For example, the passenger 130 can use the computing device 104 to check-in for a flight and print a boarding pass and/or a receipt. To that end, the computing device 104 can include one or more other devices physically integrated therein. Example devices can include a scanner (e.g., a barcode scanner, a QR code scanner), a scale (e.g., to weigh luggage), a printer (e.g., to print boarding passes and/or receipts) and a reader (e.g., credit card, driver license and/or passport reader).

Continuing with the example context, one or more of the servers 112 can execute an integrated reservation and inventory management system ("reservation system") provided as one or more computer programs. In some examples, the reservation system enables passengers to book travel on a travel conveyance and, at the time of travel, check-in. In some examples, the reservation system enables agents of travel providers to check-in and board passengers to the travel conveyance. To that end, the computing devices 102, 104 can communicate with the one or more server devices 108 to facilitate travel reservation, check-in and/or boarding using the reservation system.

A check-in workflow for travel passengers in the airline industry, for example, can include several different check-in steps, during which the reservation system is accessed. For example, a check-in workflow can include one or more steps related to searching for passenger information, assigning seats, handling baggage, adding optional services, receiving payments, and/or finalizing the passenger check-in. As an example of a passenger search step, a check-in agent can enter passenger identification information to locate a particular passenger's travel itinerary within the reservation system to begin the check-in process, and/or to enter additional data. For example, a reader (e.g., reader) can be used to read a loyalty card, a credit card, a driver's license and/or passport information to confirm passenger identity, and to retrieve a reservation associated with the passenger. In a payment step, the passenger can provide payment for the segment or additional services, including for example, checking an oversized bag or upgrading a seat to first class. In some examples, payment can be provided using a credit card which can be read using a reader. After all of the other check-in procedures have been completed, a finalization step may be provided to complete the check-in process. In some examples, one or more boarding passes and/or receipts can be printed.

As introduced above, implementations of the present disclosure are generally directed to automatically parsing data to populate a data object. More particularly, implementations of the present disclosure are directed to identifying sub-data within the data and populating data fields of the data object with the sub-data. In some examples, data can be provided as a data block that includes a sequence of characters. In some examples, the sequence of characters includes alphanumeric characters and/or symbols. In some examples, the data is parsed based on a parsing rule to identify one or more sub-data within the data. In some examples, each sub-data is provided as a data sub-block that includes a sub-sequence of characters.

In some implementations, the data is compared to a plurality of regular expressions to identify a particular regular expression that corresponds to the data. In some examples, each regular expression reflects a data format that can be received and processed. In some implementations, the data is compared to each of a plurality of previously stored regular expressions. In general, a regular expression is provided as a pattern of a sequence of characters. In some examples, the pattern identifies which portions of the data contain which information. Examples are discussed in further detail herein.

In some implementations, if the data does not correspond to a regular expression of the plurality of regular expressions, an error message is generated. In some examples, the error message can reflect that the received data is not discernable or otherwise supported.

In some implementations, if the data corresponds to a regular expression of the plurality of regular expressions, parsing rules are identified from a plurality of parsing rules based on the regular expression. In some examples, a mapping can be provided that maps each regular expression to particular parsing rules. In this manner, when a regular expression is identified as corresponding to the received data, the parsing rules are identified based on the mapping.

In some implementations, the data is parsed based on the parsing rules to identify a plurality of sub-data from the data. As noted above, in some examples, the data can be provided as a data block that includes a sequence of characters, and each sub-data can be provided as a data sub-block that includes a sub-sequence of the characters. In some implementations, a data object type is identified based on the parsing rules. In some examples, a data object corresponding to the data object type can be selected from a plurality of data objects. In some examples, a data object corresponding to the data object type can be generated. One or more object fields of the data object are populated with the sub-data based on the parsing rules.

In some implementations, and as discussed in further detail herein, the data can be received at a front-end service (e.g., provided by the computing device 102, 104 of FIG. 1). The front-end system can provide the data to a back-end service (e.g., provided by the servers 112 of FIG. 1). The back-end service can process the data, identify the parsing rules, parse the data and populate the data object based on the data. In some implementations, the back-end service provides the populated data object to the front-end service. In some examples, the front-end service executes further functionality based on the data object. For example, and as discussed in further detail herein, the front-end service can display a graphical user interface (GUI) including one or more dialogue boxes that are populated with data provided from the received data object. As another example, and as discussed in further detail herein, the front-end service can provide the received data object to another service (e.g., another back-end service) for further processing.

In some implementations, and in the example context, the data is provided from an artifact associated with a passenger. Example artifacts can include a loyalty card, a credit card, a driver license and a passport. For purposes of non-limiting illustration, implementations of the present disclosure are provided based on loyalty cards as an example artifact. In the example context, a loyalty card can include a frequent customer card (e.g., a frequent flyer card) associated with a particular travel service provider (e.g., an airline).

In some implementations, a passenger can provide a frequent customer card as identification to initiate a check-in process, for example. In some examples, the passenger can insert the frequent customer card into a scanner of a kiosk (e.g., the computing device 104 of FIG. 1) to initiate the check-in process. In some examples, the kiosk can accept a plurality of different types of frequent customer cards (e.g., frequent customer cards associated with different travel service providers).

In some examples, each frequent customer card can provide data in a different format. For example, a first frequent customer card can provide a first name, a last name and a frequent customer number in a first format. The first format can include a sequence of 56 characters where the first 24 characters include alphabetic characters associated with a last name, the next 24 characters include alphabetic characters associated with a first name and the last 8 characters are associated with a frequent customer number. In some examples, the first 2 characters of the card number are provided as alphabetic characters, while the last 6 characters of the card number are provided as numeric characters. As another example, a second frequent customer card can provide a first name, a last name and a frequent customer number in a second format. The second format can include a sequence of 51 characters where the first 20 characters include alphabetic characters associated with a first name, the next 20 characters include alphabetic characters associated with a last name and the last 11 characters include numeric characters associated with a frequent customer number.

An application executed by the kiosk can provide data read from the frequent customer card to a back-end service (e.g., provided by the servers 112 of FIG. 1). In some examples, the application can pre-process the data before transmitting the data to the back-end service. For example, a third party system can add framing data to the scanned data that is provided to the front-end service. The data can be pre-processed to remove the framing data before sending the data to the back-end service. In some examples, the application can transmit the data to the back-end service without pre-processing the data.

In some implementations, the back-end service receives the data and compares the data to one or more regular expressions of a plurality of regular expressions. In some examples, the back-end service compares the data to the regular expressions until the back-end service identifies a matching regular expression. Each regular expression defines a data format pattern. For example, a first regular expression can define a pattern that includes 56 alphabetic characters including 24 alphabetic characters followed by another 24 alphabetic characters followed by 2 alphabetic characters followed by 6 numeric characters. As another example, a second regular can define a pattern of 51 characters including 20 alphabetic characters followed by 20 alphabetic characters followed by 11 numeric characters.

As noted above, if a matching regular expression is not identified, an error message can be generated. For example, an error message can be sent from the back-end service to the application executing on the kiosk and, in response, a message can be displayed to the passenger (e.g., "card not recognized"). In some implementations, a default data object can be generated if a matching regular expression is not identified. For example, it can be determined that data scanned from a boarding pass does not match any of a plurality of regular expressions. In response, a default data object can be generated that is populated with a default (e.g., Unknown Result flag set to true).

If, however, a matching regular expression is identified, one or more parsing rules can be identified. In some implementations, each regular expression can be mapped to one or more parsing rules for parsing data that corresponds to the regular expression. In some examples, the parsing rules further define a type of data object that is to be populated with the data.

Continuing with the above examples, first data from the first frequent customer card can be received at the back-end service and can be compared to each of the first regular expression and the second regular expression. For example, it can be determined that the first data corresponds to the first regular expression. Similarly, second data from the second frequent customer card can be received at the back-end service and can be compared to each of the first regular expression and the second regular expression. For example, it can be determined that the second data corresponds to the second regular expression. A first set of parsing rules can be identified based on the first regular expression and a second set of parsing rules can be identified based on the second regular expression. For example, a pre-defined mapping can be provided and stored in computer-readable memory that maps the first regular expression to the first set of parsing rules and the second regular expression to the second set of parsing rules.

As noted above, the parsing rules can further define a type of data object that is to be populated with the data. Continuing with the above examples, the first data and the second data are provided from first and second frequent customer cards, respectively. Consequently, each of the first set of parsing rules and the second set of parsing rules can provide that a frequent customer card data object is to be populated. As another example, data can be received from a credit card. Consequently, it can be determined that a credit card data object is to be populated. As another example, data can be received from a driving license. Consequently, it can be determined that a driving license data object is to be populated. As another example, data can be received from a passport. Consequently, it can be determined that a passport data object is to be populated. As another example, data can be received from third parties (e.g., a travel service provider that is able to sell accommodations aboard travel conveyances of other travel service providers). In such an example, the data can include data strings sent from a third party that can be parsed an can be used to populate a corresponding data object (e.g., a Booking Sold data object). In still another example, data can include a data string provided from an external device (e.g., a response code in response to a command that had been sent to the device). In such an example, the response code can be parsed as discussed herein to generate a device response object that can be used to determine whether the command was successful (e.g., parsing the response message after sending a print command to determine whether the printer is out of paper).

In some implementations, the data is parsed based on the parsing rules and the data object is populated based on the data. In some examples, the data object includes a plurality of data fields, each data field being populated with sub-data of the data. Continuing with the examples above, a first data object can be populated based on sub-data parsed from the first data. For example, the first data can be parsed to provide last name sub-data, first name sub-data and card number data. A last name field of the first data object can be populated with the last name sub-data, a first name field of the first data object can be populated with the first name sub-data, and a card number field of the first data object can be populated with the card number sub-data.

In some implementations, the data object is provided to the front-end system. For example, the kiosk can receive the data object and can execute functionality in response thereto. In some examples, the kiosk can display a GUI to the passenger with one or more dialog boxes, for example, being populated with data from the data object. In some examples, the kiosk can issue a request based on the data object. For example, the kiosk can request reservation information from a back-end system by issuing a request to the back-end system, the request including data provided in the data object. In response to the request, the back-end system can retrieve reservation information associated with the particular passenger (e.g., based on passenger name and/or card number) and can provide a response to the kiosk, the response including the reservation information.

In some implementations, the regular expressions and/or parsing rules can be extended to account for additional data formats that are to be handled. In some examples, a regular expression can be added to the plurality of regular expressions and parsing rules can be added to the plurality of parsing rules. The mapping from regular expressions to parsing rules can be updated to include a mapping between the newly added regular expression and the newly added parsing rules. The newly added regular expression can define a data format that aligns with a new data format that is to be handled and the newly added parsing rules can provide instructions on parsing data in the new data format to populate a corresponding data object.

For example, a kiosk (e.g., the computing device 104 of FIG. 1) can be initially configured to handle the first frequent customer card (e.g., associated with a first travel service provider) and the second customer card (e.g., associated with a second travel service provider), discussed above. It can be determined that the kiosk is to be configured to also handle a third frequent customer card (e.g., associated with a first travel service provider). Consequently, a configuration of the kiosk can be updated to include a third regular expression, in addition to the first and second regular expressions, that corresponds to the data format of the third frequent customer card, and to include a third set of parsing rules, in addition to the first and second sets of parsing rules. In this manner, when third data from a third frequent customer card is received, the data format can be recognized and processed to generate a corresponding data object.

In some implementations, data can be provided as textual input to an application executed on a front-end system. For example, the data can be provided as free-form text entered by the agent 120 to the computing device 102. For example, a GUI can be displayed on the computing device 120 for receiving data input by the agent 120. The data can be provided to a back-end system and can be compared to a plurality of regular expressions. In some examples, it can be determined that the data corresponds to one or more regular expressions. In response, respective parsing rules can be identified and can be processed to populate respective one or more data objects. In some examples, the respective one or more data objects can be provided to the front-end system.

In some examples, the GUI displayed by the front-end system can include a dialog box into which free-form text can be input. In some examples, the input text can be provided as a search query. For example, the agent 120 can input the free-form text in an effort to search a reservation system to identify a reservation record associated with a particular passenger. In some examples, the free-form text can include information (e.g., first name, last name, departure station and/or arrival station) that can be used to identify the reservation record associated with the particular passenger. The free-form text can be provided as data to the back-end system. In some examples, it can be determined that the data corresponds to one or more regular expressions. In some examples, each regular expression can be associated with a search category. Example search categories can include first name, last name, departure station and/or arrival station.

In response, respective parsing rules can be identified and can be processed to populate one or more data objects. In some examples, a single data object can be provided and can include a plurality of data fields, where each data field is associated with a search category. In some examples, a plurality of data objects can be provided where each data object is associated with a search category. In any case, the data object(s) can be provided to the front-end system. In some examples, the front-end system can provide the data object(s) to the reservation system. The reservation system can process the data object(s) as respective search queries to provide one or more search results that are responsive to the search queries. In some examples, the search results can include one or more passenger records. The search results can be provided to the front-end system and can be displayed to the agent 120.

As one example, an agent can enter the text "son" into a front-end service in an effort to search for flights that fly to San Diego (which has an airport code of SAN) or to search for a passenger with the last name "Sanders." The front-end service is unaware of the particular topic the agent is searching for. Consequently, the parsing functionality, discussed herein, can generate a list of potential search requests using the given data. In some examples, an airline could also create their own search string formats. For example, "A 4556 Sa" could be a search string format that indicates a search for a passenger who's name starts with 'Sa' on AirAsia flight 4556. Accordingly, the parsing functionality of the present disclosure enables customized search behavior.

Figure 2:
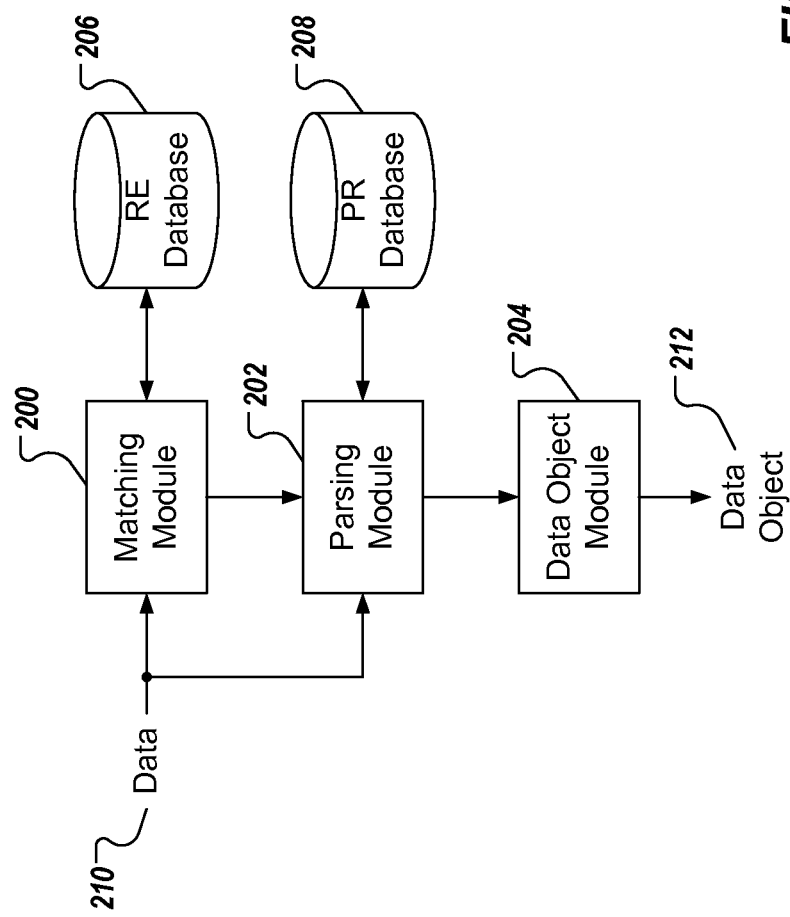
FIG. 2 depicts example modules in accordance with implementations of the present disclosure.

FIG. 2 depicts example modules in accordance with implementations of the present disclosure. In the depicted example, the modules include a matching module 200, a parsing module 202 and a data object module 204. In some examples, each module is provided as one or more computer-executable programs. For example, one or more computing devices (e.g., the servers 112 of FIG. 1) can execute the one or more computer-executable programs to provide the modules. In some examples, the modules can be provided in a single computer-executable program. In the depicted example, the matching module 200 is in communication with a regular expression (RE) database 206 and the parsing module is in communication with a parsing rule (PR) database 208.

In some examples, the matching module 200 receives data 210 from a front-end system. The matching module 200 compares the format of the data 210 to one or more regular expressions stored in the RE database 206. If the matching module 200 does not identify a regular expression that matches the format of the data 210, an error message can be generated. If the matching module 200 identifies a regular expression that matches the format of the data 210, the matching module 200 can provide an identifier associated with the regular expression to the parsing module 202.

In some examples, the parsing module 202 receives the data 210 and the identifier associated with the regular expression. In some examples, the parsing module 202 identifies a set of parsing rules based on the identifier associated with the regular expression. For example, the parsing module 202 can access a mapping based on the identifier to identify the set of parsing rules that are to be applied. The parsing module 202 can parse the data 210 based on the parsing rules to provide a plurality of sub-data. In some examples, the parsing module 202 can provide the sub-data to the data object module 204.

In some examples, the data object module 204 can populate a data object based on the sub-data to provide a populated data object 212. In some examples, the parsing rules can identify a type of data object that is to be populated and the parsing module 202 can provide a type signal to the data object module 204. The data object module 204 can use the type signal to select or generate the data object based on a type. The data object module 204 can provide the populated data object 212 to the front-end system.

In some implementations, the regular expressions, the parsing rules and the mapping can be updated to enable handling of data from newly expected data sources. For example, the RE database 206 can be updated to include a regular expression that corresponds to a data format expected from a new data source. The PR database 208 can be updated to include parsing rules that correspond to parsing data from the new data source. The mapping used by the parsing module 202 can be updated to map an identifier associated with the newly added regular expression to the newly added parsing rules.

Figure 3:
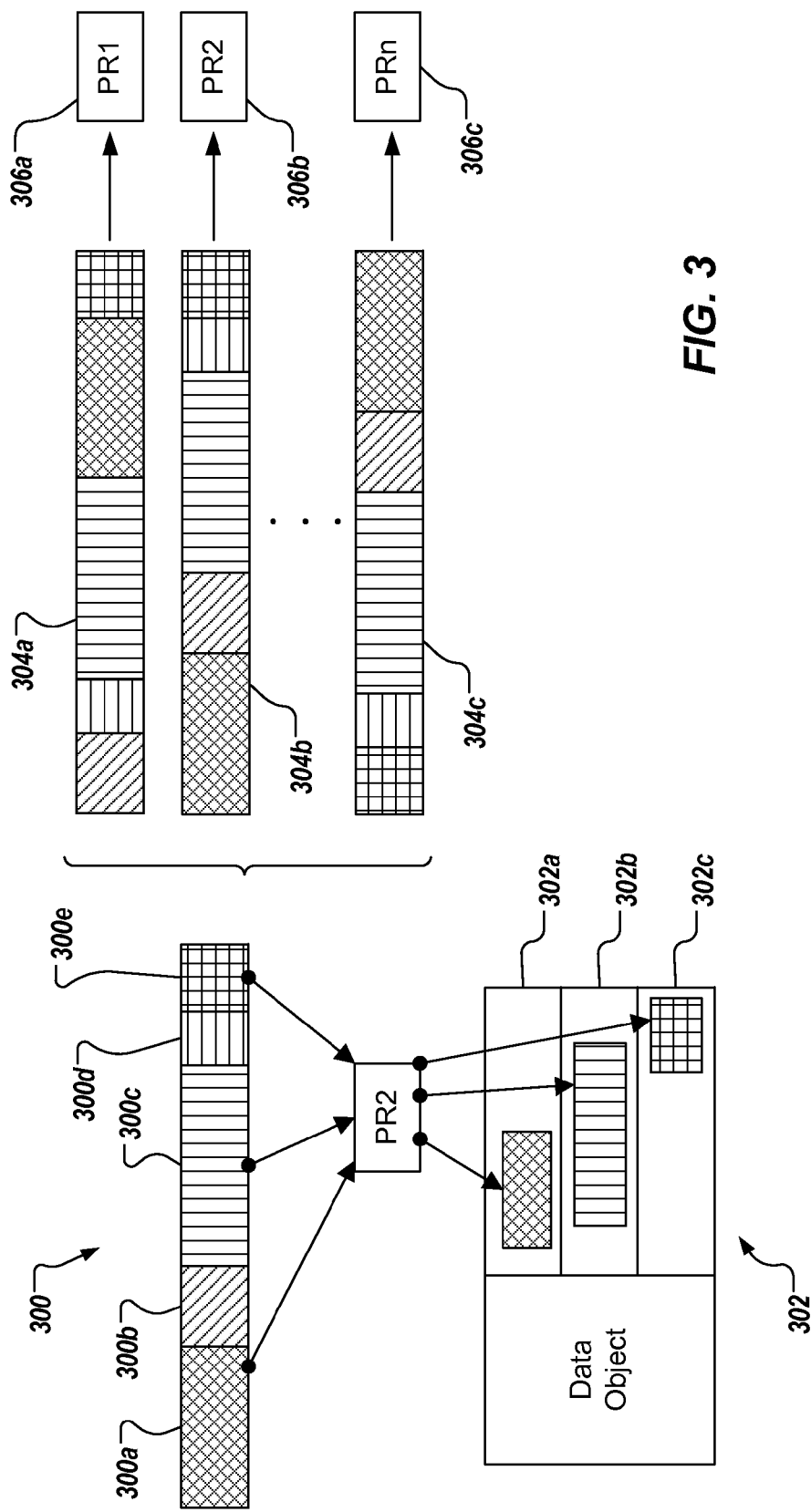
FIG. 3 depicts an example parsing and populating of an example data object.

FIG. 3 depicts an example parsing of data 300 and populating of an example data object 302. In some examples, the data 300 includes a sequence of characters provided as a plurality of concatenated character sub-sequences 300a, 300b, 300c, 300d, 300e. In some examples, the data object includes a plurality of data fields 302a, 302b, 302c. A plurality of regular expressions 304a, 304b, 304c can be provided. In the depicted example, each of the regular expressions 304a, 304b, 304c is mapped to a respective set of parsing rules 306a, 306b, 306c.

The data 300 can be compared to one or more of the regular expressions 304a, 304b, 304c to identify a matching regular expression. In the depicted example, the format of the data 300 matches the format pattern defined in the regular expression 304b. Consequently, the set of parsing rules 306b can be selected for parsing of the data 300 and population of the data object 302. In some examples, the data object 302 can be generated after identifying the set of parsing rules 306b and based on a type of data object defined in the set of parsing rules 306b.

Figure 4:
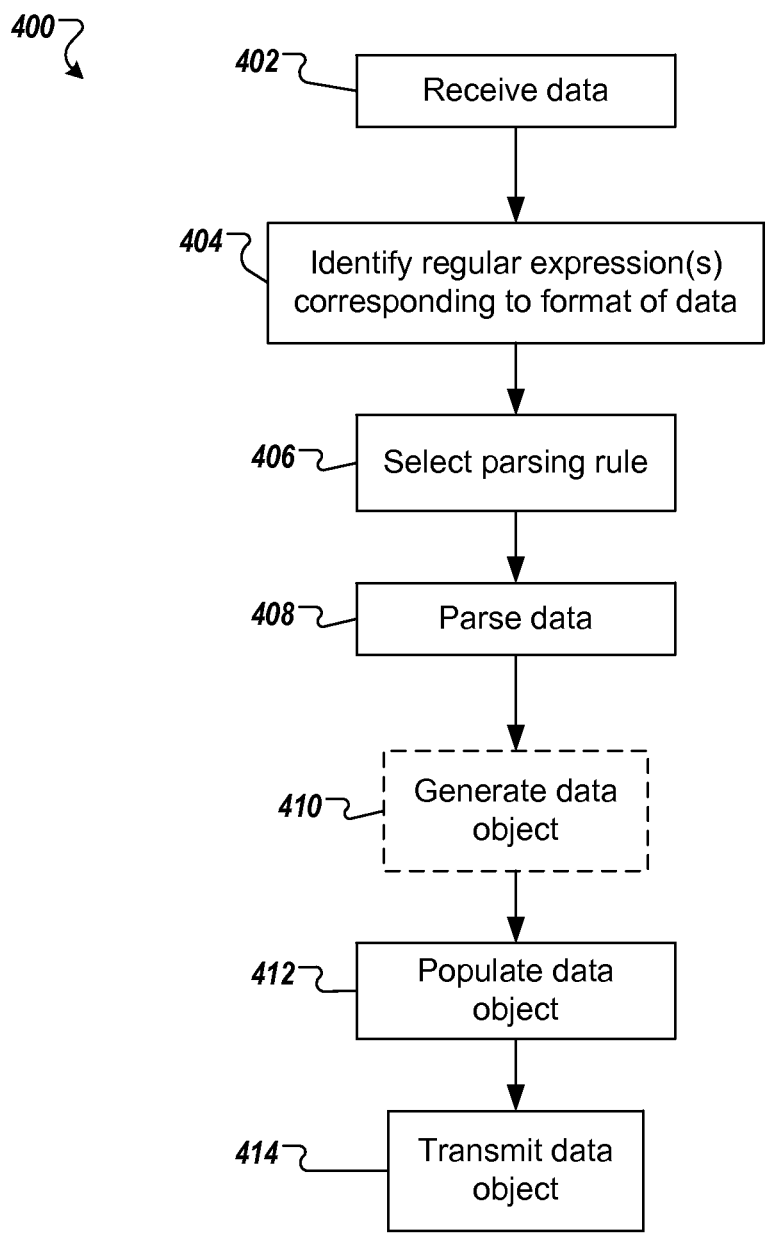
FIG. 4 depicts an example process that can be executed in implementations of the present disclosure.

FIG. 4 depicts an example process 400 that can be executed in implementations of the present disclosure. In some examples, the example process 400 can be provided using one or more computer programs that are executed using one or more computing devices.

Data is received (402). For example, data can be received at a back-end service (e.g., provided by the servers 112 of FIG. 1) from a front-end service (e.g., provided on the computing device 102, 104). One or more regular expressions corresponding to a format of the data are identified (404). For example, the data can be compared to a plurality of regular expressions to identify one or more regular expressions that define a pattern that corresponds to the format of the data. A parsing rule is selected based on an identified regular expression (406). For example, an identifier associated with the identified regular expression can be used as an index to a mapping to select a parsing rule that is to be used to parse the data. The data is parsed (408). For example, the data can be parsed based on the parsing rules to provide a plurality of sub-data.

In some implementations, a data object is generated (410). For example, the parsing rules can define a type of data object that is to be generated. The data object is populated (412). For example, data fields of the data object are populated with sub-data parsed from the data. In some examples, the parsing rules map the sub-data to respective data fields. The data object is transmitted (414). For example, the data object is transmitted from the back-end service (e.g., provided by the servers 112 of FIG. 1) to the front-end service (e.g., provided on the computing device 102, 104).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method for automatically parsing data from disparate data sources, the method being executed using one or more processors and comprising:

receiving, at the one or more processors, first data from a first data source;

identifying, using the one or more processors, a first regular expression from a plurality of regular expressions, the first regular expression corresponding to a data format of the first data;

in response to identifying the first regular expression, selecting, using the one or more processors, a first set of parsing rules from a plurality of parsing rules based on the first regular expression;

processing, using the one or more processors, the first set of parsing rules for:
   parsing the first data to provide a first set of sub-data, and defining a type of a first data object, the first data object comprising a plurality of data fields to be populated with sub-data of the first data;

providing, using the one or more processors, the first data object based on the type;

populating, using the one or more processors, one or more of the plurality of data fields of the first data object with respective sub-data from the first set of sub-data; and transmitting, using the one or more processors, the first data object to a computing device.

2. The method of claim 1, wherein providing the first data object based on the type comprises generating the first data object.

3. The method of claim 1, wherein identifying the first regular expression comprises comparing the first data to each of the plurality of regular expressions.

4. The method of claim 1, wherein selecting a first set of parsing rules based on the first regular expression is based on a mapping between the plurality of regular expressions and sets of parsing rules.

5. The method of claim 4, wherein an identifier associated with the first regular expression is used to identify the first set of parsing rules from the mapping.

6. The method of claim 1, wherein populating the one or more of the plurality of data fields of the first data object with respective sub-data from the first set of sub-data is based on the first set of parsing rules.

7. The method of claim 6, wherein one or more parsing rules in the first set of parsing rules maps sub-data to data fields.

8. The method of claim 1, wherein the first data source comprises an artifact associated with a person.

9. The method of claim 8, wherein the artifact comprises one of a customer card, a driving license, a credit card and a passport.

10. The method of claim 1, wherein the first data comprises an entirety of data stored on the first data source.

11. The method of claim 1, wherein the first data is one of electronically stored on the first data source, magnetically stored on the first data source and graphically stored on the first data source.

12. The method of claim 1, wherein the first data is received from the computing device.

13. The method of claim 1, wherein the computing device comprises one of an agent terminal and a kiosk.

14. The method of claim 1, further comprising storing the first data object in computer-readable memory.

15. The method of claim 1, wherein the first data comprises free-form text that is input by a user of the computing device.

16. The method of claim 15, wherein the first data object comprises one or more search queries that can be processed to provide search results responsive to the first data.

17. The method of claim 1, further comprising:
   storing a second regular expression in a regular expression database; and
   storing a second set of parsing rules in a parsing rule database, the second set of parsing rules corresponding to the second regular expression and being executable to populate one or more data objects based on data provided from one or more data sources.

18. The method of claim 1, further comprising:
   receiving, at the one or more processors, second data from a second data source;
   identifying, using the one or more processors, a second regular expression that corresponds to a data format of the second data;

selecting, using the one or more processors, a second set of parsing rules from a plurality of parsing rules based on the second regular expression;

parsing, using the one or more processors, the second data based on the second set of parsing rules to provide a second set of sub-data;

populating, using the one or more processors, data fields of a second data object with respective sub-data from the second set of sub-data; and transmitting, using the one or more processors, the second data object to the computing device.

19. A non-transitory computer-readable storage medium coupled to one or more processors and having instructions stored thereon which, when executed by the one or more processors, cause the one or more processors to perform operations for automatically parsing data from disparate data sources, the operations comprising:

receiving first data from a first data source;

identifying a first regular expression from a plurality of regular expressions, the first regular expression corresponding to a data format of the first data;

in response to identifying the first regular expression, selecting a first set of parsing rules from a plurality of parsing rules based on the first regular expression;

processing the first set of parsing rules for:
  parsing the first data to provide a first set of sub-data, and
  defining a type of a first data object, the first data object comprising a plurality of data fields to be populated with sub-data of the first data;

providing the first data object based on the type;

populating one or more of the plurality of data fields of the first data object with respective sub-data from the first set of sub-data; and transmitting the first data object to a computing device.

20. A system, comprising:

one or more processors; and a computer-readable storage device coupled to the one or more processors and having instructions stored thereon which, when executed by the one or more processors, cause the one or more processors to perform operations for automatically parsing data from disparate data sources, the operations comprising:

receiving first data from a first data source;

identifying a first regular expression from a plurality of regular expressions, the first regular expression corresponding to a data format of the first data;

in response to identifying the first regular expression, selecting a first set of parsing rules from a plurality of parsing rules based on the first regular expression;

processing the first set of parsing rules for:
  parsing the first data to provide a first set of sub-data, and
  defining a type of a first data object, the first data object comprising a plurality of data fields to be populated with sub-data of the first data;

providing the first data object based on the type;

populating one or more of the plurality of data fields of the first data object with respective sub-data from the first set of sub-data; and transmitting the first data object to a computing device.

\* \* \* \* \*